(12) United States Patent
Stephan et al.

(10) Patent No.: US 11,437,952 B2
(45) Date of Patent: Sep. 6, 2022

(54) COMPOSITION ROOF ACCESSORY MOUNT

(71) Applicant: PEGASUS SOLAR, INC., Richmond, CA (US)

(72) Inventors: Erich Kai Stephan, Richmond, CA (US); Glenn Harris, Sausalito, CA (US); Nick Wenzel, Richmond, CA (US); Peter Wilke, Richmond, CA (US)

(73) Assignee: PEGASUS SOLAR, INC., Richmond, CA (US)

( * ) Notice: Subject to any disclaimer, the term of this patent is extended or adjusted under 35 U.S.C. 154(b) by 287 days.

(21) Appl. No.: 16/818,037

(22) Filed: Mar. 13, 2020

(65) Prior Publication Data

US 2020/0313608 A1  Oct. 1, 2020

Related U.S. Application Data

(60) Provisional application No. 62/826,749, filed on Mar. 29, 2019.

(51) Int. Cl.
| | |
|---|---|
| *H02S 40/34* | (2014.01) |
| *H02S 30/10* | (2014.01) |
| *H02S 20/23* | (2014.01) |

(52) U.S. Cl.
CPC .............. *H02S 40/34* (2014.12); *H02S 20/23* (2014.12); *H02S 30/10* (2014.12)

(58) Field of Classification Search
None
See application file for complete search history.

(56) References Cited

U.S. PATENT DOCUMENTS

| | | | |
|---|---|---|---|
| 7,658,356 B1 * | 2/2010 | Nehls .................... | F24S 25/613 248/237 |
| 8,100,122 B2 * | 1/2012 | Collins ................. | F24S 30/455 126/623 |
| 2004/0255523 A1 * | 12/2004 | Bibaud ............... | E04D 13/1476 52/58 |
| 2012/0222380 A1 * | 9/2012 | Wentworth ............. | H02S 20/23 248/237 |
| 2016/0226435 A1 * | 8/2016 | Almy ..................... | F24S 25/636 |
| 2018/0191290 A1 * | 7/2018 | Guthrie ................... | H02S 30/00 |
| 2018/0274238 A1 * | 9/2018 | Aliabadi ................. | E04D 13/00 |

* cited by examiner

*Primary Examiner* — Steven M Marsh
(74) *Attorney, Agent, or Firm* — Polsinelli LLP

(57) ABSTRACT

A mount for use over a roof flashing on a composition roof. The mount includes a central aperture for a fastener, a top surface with a horizontal platform extending laterally from the top surface, and a conical inner surface to cooperate with a conical protrusion on the roof flashing.

10 Claims, 5 Drawing Sheets

COMPOSITION ROOF ACCESSORY MOUNT

CROSS-REFERENCE TO RELATED APPLICATION

This application claims the benefit of U.S. Provisional Patent Application No. 62/826,749, filed Mar. 29, 2019, which is incorporated herein by reference in its entirety.

BACKGROUND

Rooftop solar installations sometimes require running electrical wire across a roof and to junction boxes to connect solar photovoltaic modules. The wire is held in Electrical Metallic Tubing ("EMT") conduit pipe, which by many building codes must be anchored at spaced attachment points and not come into direct contact with the roof. The attachment system must also be flashed for waterproofing.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1A:
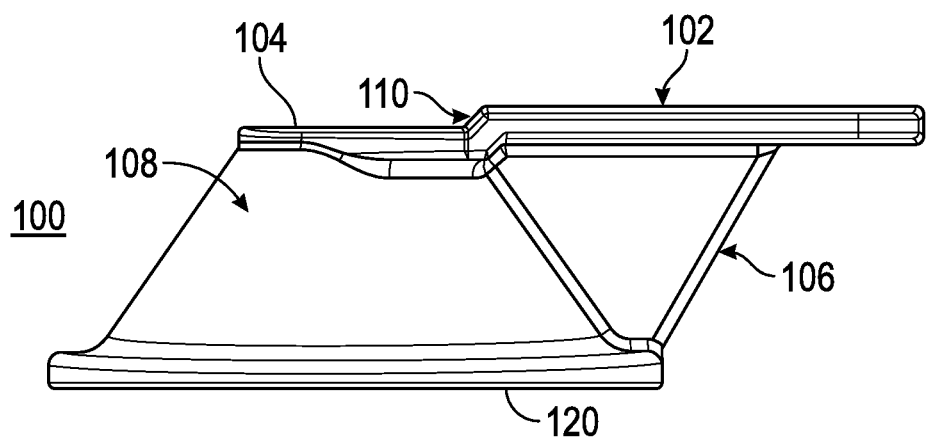
FIG. 1A illustrates a mount, as seen from the side edge.

FIG. 1A depicts the side profile of a Composite Roof Accessory Mount ("mount") 100. The mount 100 may have one or more horizontal platforms 102 extending out from a center of the top surface 104. There may be a vertical rib 106 connecting a conical outer surface 108 and the horizontal platform 102 which adds strength to the horizontal platform 102 in tension or compression loads. Between the top surface 104 and the horizontal platform 102 may be a difference of height characterized by an angled, curved or vertical step 110. The vertical step 110 serves the purpose of a space for a sealing washer to rest below the horizontal platform 102. This allows a bracket or strap to be secured by the fastener on a similar plane to the platform to provide a more secure connection and restrict vertical movement of EMT conduit. This also allows for the top of the sealing washer to be substantially coincident with the top plane of the horizontal platform 102 to provide a substantially even mounting surface for the EMT strap. The step may have edges to hold the sealing washer in place prior to the fastener being installed. These edges may have openings to allow for water drainage that builds up on the sealing washer.

Figure 1B:
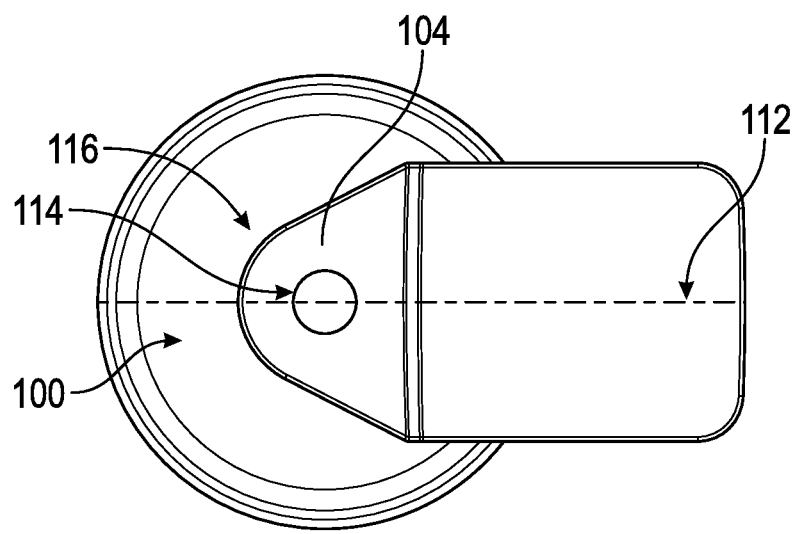
FIG. 1B illustrates a mount, as seen from the topside.

The mount 100 may be manufactured through various manufacturing techniques. As illustrated in FIG. 1B, central ridge line 112 may run perpendicular to short edge of horizontal platform 102. The surfaces on top of the horizontal platform 102 and area surrounding aperture 114 have casting draft at an angle perpendicular and downward from central ridge line 112. This feature allows for easier manufacturing methods and for water to shed from these surfaces and away from the aperture 114.

FIG. 1B illustrates the topside of the mount 100. The top surface 104 may have a radiused edge 116 tangent to a side surface 118 to connect with the horizontal platform 102. The mount 100 may have a conical outer surface 108 extending from substantially planar lower surface 120 to top surface 104 where there may be an aperture 114 for a fastener. This fastener aperture 114 may be cordial to the conical outer surface 108.

Figure 1C:
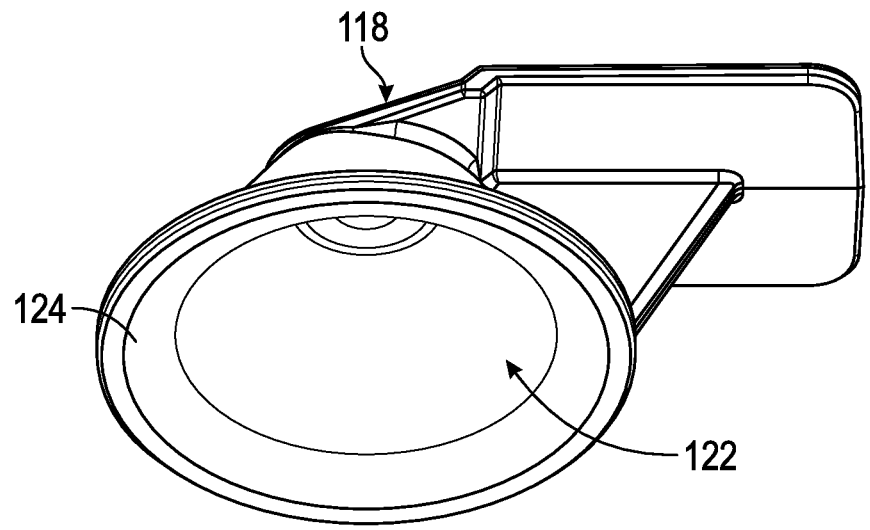
FIG. 1C illustrates a mount, as seen from the underside.

FIG. 1C illustrates the underside of the mount 100. The cone shape of the underside forms a cavity 122 that may cooperate with or fit over the cone of a roof flashing. The surface of conical outer surface 108 prevents water flowing down the flashing from accessing the fastener body, and creates a minimal space between a flashing and mount 100. The planar lower surface 120 of the mount 100 that coincide with the flashing may have a radius 124 to prevent scratching the flashing.

Figure 2A:
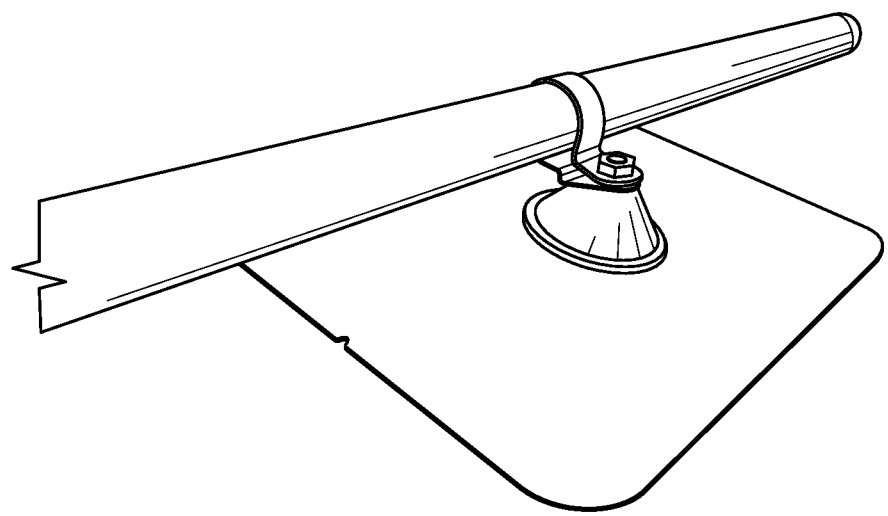
FIG. 2A illustrates a mount 100 securing EMT conduit parallel to the x-axis of the roof plane.
Figure 2B:
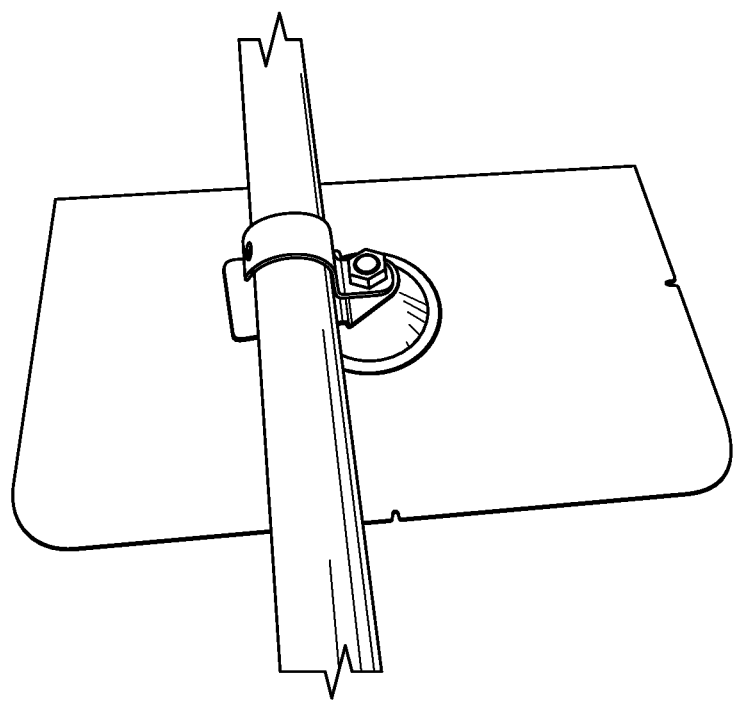
FIG. 2B illustrates a mount securing EMT conduit parallel to the y-axis of the roof plane.
Figure 2C:
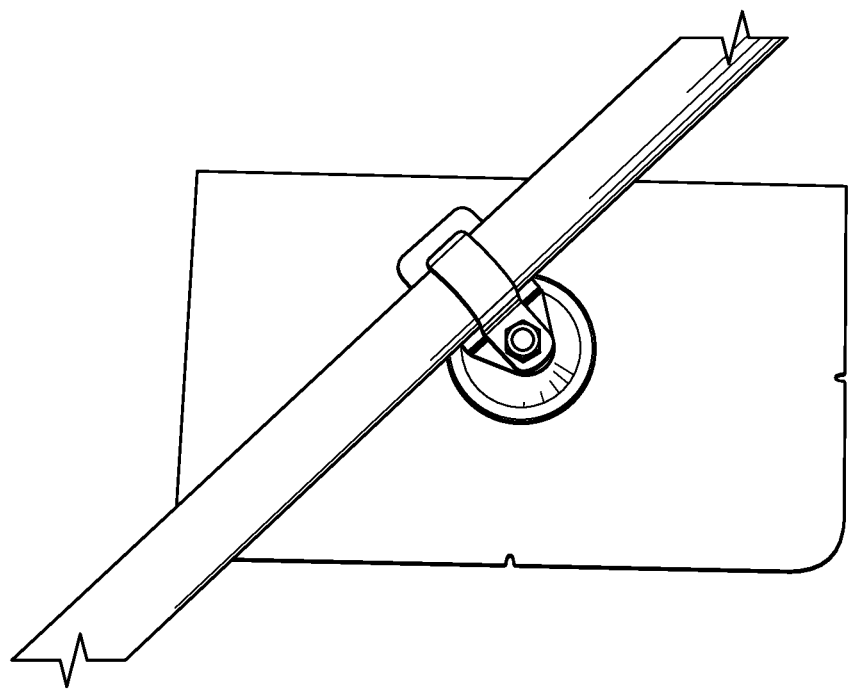
FIG. 2C illustrates a mount securing EMT conduit in diagonal direction across roof.

FIGS. 2A, 2B and 2C illustrate the mount 100 serving as a platform for the mechanical connection to EMT conduit. A fastener is used to secure an EMT conduit strap over a sealing washer, mount 100 and a flashing into the roof deck. The EMT conduit is secured from horizontal motion by the strap and vertically by the mount 100 horizontal platform 102 underneath and the strap above.

Figure 3A:
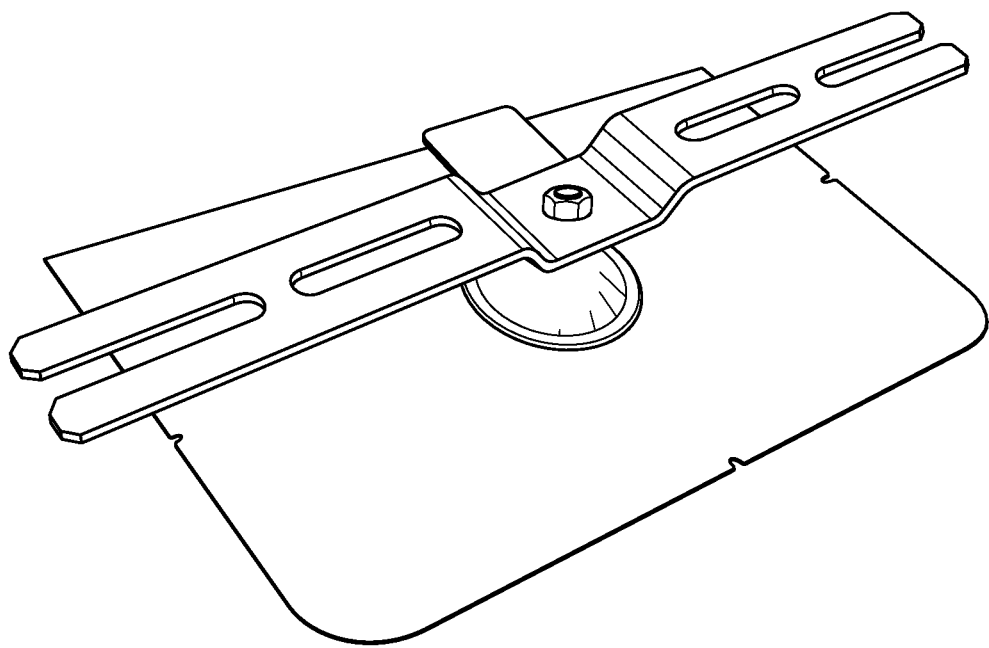
FIG. 3A illustrates a mount with a J-box Bracket attached.
Figure 3B:
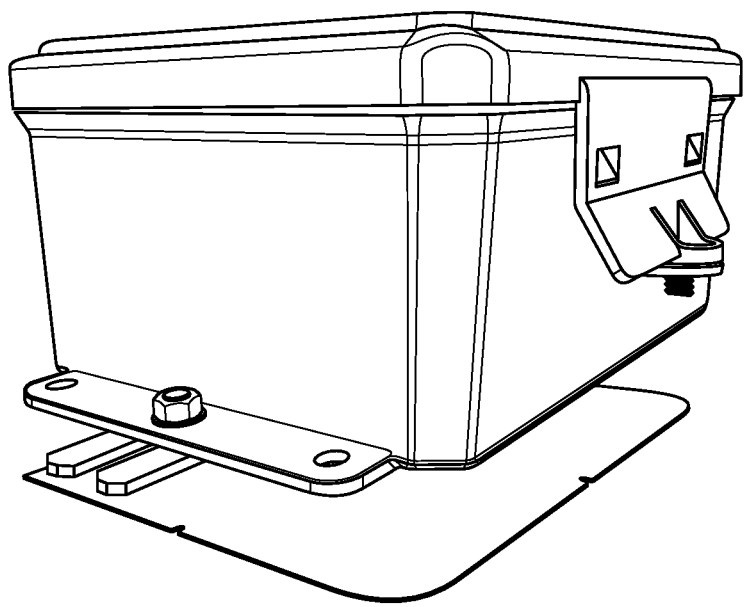
FIG. 3B illustrates a mount with a J-box Bracket attached securing a Junction Box to the roof.

FIGS. 3A and 3B illustrate the mount 100 serving as a platform for attaching a junction box to the roof. A fastener is used to secure a junction box bracket over a sealing washer, mount 100 and a flashing into the roof deck. A junction box may be attached to the junction box bracket. The mount 100 keeps the junction box secured and raised from the roof surface.

Figure 4:
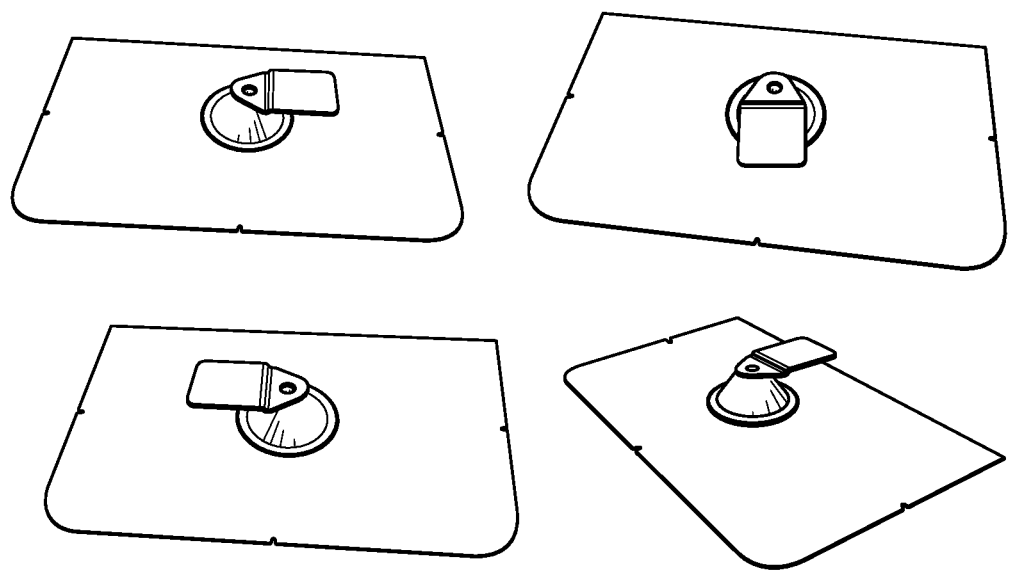
FIG. 4 illustrates examples of mounting direction options for a mount.

FIG. 4 illustrates example orientations the mount 100 may be installed. The mount 100 may be installed over a flashing cone in any orientation around the central axis of the fastener.

Figure 5:
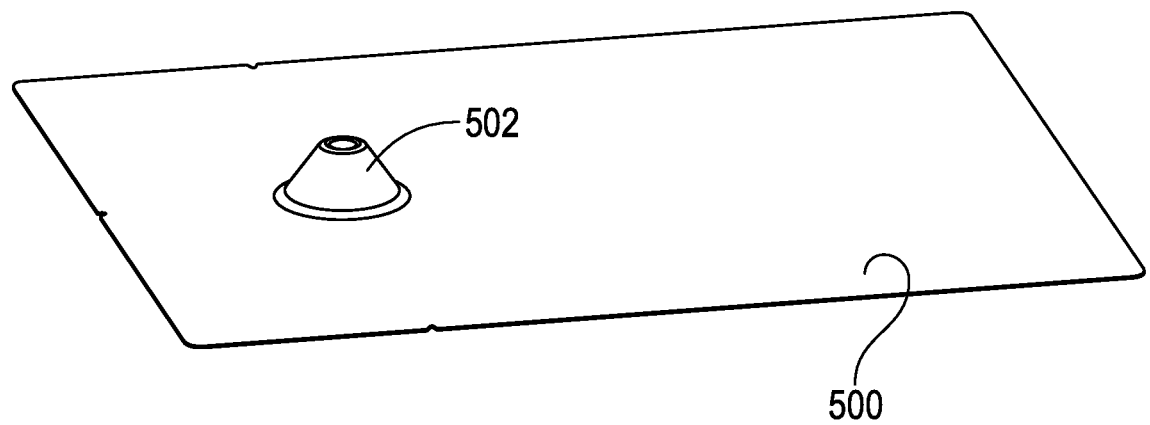
FIG. 5 illustrates an example flashing for use with a mount.

FIG. 5 illustrates an example flashing 500 that can be used with mount 100. The flashing 500 includes a conical shaped upward protrusion 502 that cooperates with cavity 122 on the underside of mount 100.

In some examples of the present invention, the mount 100 is constructed of a stainless steel material, an aluminum alloy, a zinc alloy, or a plastic material.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A mount comprising:
   a substantially planar lower surface configured to overlay a roof flashing;
   at least one horizontal platform extending laterally from a top surface of the mount;
   an aperture in the top surface configured to receive a fastener;
   a conical outer surface connecting the planar lower surface to the top surface; and
   a vertical rib connected to a lower surface of the horizontal platform and connected to the conical outer surface.

2. The mount of claim 1, further comprising:
   a conical inner surface forming a cavity that is configured to receive an upward protrusion of the roof flashing.

3. The mount of claim 1, wherein a connection between the top surface and the horizontal platform is a step, with the top surface vertically offset from the horizontal platform by a thickness of a sealing washer.

4. The mount of claim 3, wherein the step is angled.

5. The mount of claim 3, wherein the step is curved.

6. The mount of claim 3, wherein the step is vertical.

7. The mount of claim 1, wherein the horizontal platform includes a casting draft and a central ridge line defined by the casting draft.

8. The mount of claim 1, wherein the top surface includes an edge to hold a sealing washer in place before a fastener is inserted through the aperture.

9. The mount of claim 1, wherein outer edges of the planar lower surface have a radius.

10. The mount of claim 1, wherein the mount is constructed from one of stainless steel, aluminum alloy, zinc alloy, and plastic.

* * * * *